(12) United States Patent
Collins et al.

(10) Patent No.: US 8,747,586 B2
(45) Date of Patent: Jun. 10, 2014

(54) METHOD OF SECURING A LINER PANEL TO A CASING

(76) Inventors: Ross Collins, Rowville (AU); Ruth A. Barcock, Derby (GB)

( * ) Notice: Subject to any disclaimer, the term of this patent is extended or adjusted under 35 U.S.C. 154(b) by 341 days.

(21) Appl. No.: 12/883,367

(22) Filed: Sep. 16, 2010
(Under 37 CFR 1.47)

(65) Prior Publication Data
US 2011/0232833 A1    Sep. 29, 2011

(30) Foreign Application Priority Data
Sep. 30, 2009    (GB) .................................. 0917123.2

(51) Int. Cl.
*F01D 25/24*    (2006.01)
*B32B 37/18*    (2006.01)

(52) U.S. Cl.
USPC ........................... 156/71; 415/173.4; 415/197

(58) Field of Classification Search
USPC ........... 156/71, 145, 289, 297, 299, 300, 313; 415/173.4, 197
See application file for complete search history.

(56) References Cited

U.S. PATENT DOCUMENTS

| | | | |
|---|---|---|---|
| 3,193,441 A | | 7/1965 | Schafer |
| 3,269,887 A | | 8/1966 | Windecker |
| 3,574,429 A | * | 4/1971 | Reising .......................... 384/300 |
| 4,387,317 A | * | 6/1983 | Alkire et al. ................... 310/260 |
| 4,414,340 A | * | 11/1983 | Senatore et al. ............... 523/219 |
| 4,568,804 A | * | 2/1986 | Luehring ....................... 218/138 |
| 5,388,959 A | | 2/1995 | Forrester et al. |
| 5,773,121 A | | 6/1998 | Meteer et al. |
| 5,837,739 A | | 11/1998 | Nowak et al. |
| 2004/0131839 A1 | | 7/2004 | Eagle |
| 2006/0201741 A1 | * | 9/2006 | Inoue et al. .................... 181/204 |

FOREIGN PATENT DOCUMENTS

| | | |
|---|---|---|
| EP | 0 798 107 A2 | 10/1997 |
| EP | 1 386 828 A2 | 2/2004 |
| GB | 1 467 421 | 3/1977 |
| GB | 2 066 354 A | 7/1981 |
| GB | 2 407 343 A | 4/2005 |
| GB | 2 407 344 A | 4/2005 |
| WO | WO 99/17686 | 4/1999 |
| WO | WO03/021096 * | 3/2012 .............. F02B 77/11 |

OTHER PUBLICATIONS

Great Britain Search Report dated Jan. 27, 2010 in Great Britain Patent Application No. 0917123.2.
European Search Report dated Jul. 6, 2012 in European Patent Application No. EP 10 17 6991.

* cited by examiner

*Primary Examiner* — Scott W Dodds
(74) *Attorney, Agent, or Firm* — Oliff PLC

(57) ABSTRACT

A liner panel, such as a cassette 120 of a fan track liner of a gas turbine engine, is secured to a casing of the engine at flanges 124 and 126. Foam pads 42 are disposed between the casing 40 and the cassette 120 to support the cassette 120 from the casing 40.

The pads 42 may be made from a reticulated polyurethane foam which is sufficiently resilient to be compressed and to expand to remain in contact with the cassette 120 and the casing 40 as the cassette 120 moves towards and away from the casing 40 during the assembly process. The foam is impregnated with a hardener composition which is uncured during installation of the cassette 120, but subsequently cures to increase the rigidity of the pads 42.

20 Claims, 2 Drawing Sheets

METHOD OF SECURING A LINER PANEL TO A CASING

This invention relates to a method of securing a liner panel to a casing and is particularly, although not exclusively, concerned with securing a fan track liner to a fan casing of a turbomachine such as a gas turbine engine.

It is usual for the blades of the fan of a turbo fan engine to run along a fan track liner supported by a fan casing. The fan track liner is designed to be abradable by the blade tips, and is consequently susceptible to damage. It is desirable for the fan track liner to be easily removable from the fan casing without damage to the casing that can occur if the liners have been securely bonded to the casing so that a damaged liner, or a section of a damaged liner, can be replaced.

Fan track liners typically comprise a panel in the form of a cassette or tray which supports the abradable liner structure and may also include portions having noise attenuation properties. In the interests of weight saving, the liner panel may be relatively thin, and therefore flexible, and so requires support from the fan casing to resist the loads applied to it in operation of the engine, for example loads generated by the fan blades rubbing against the fan track liner. A stack up of tolerances means that it is not possible to ensure intimate contact with the casing over the full extent of the cassette, and so it is known to apply a layer of an compressible material between the cassette and the fan casing. The compressible material needs to be relatively stiff to provide the required support. There is a tendency for the compressible material to be over-compressed during installation of the fan track liner so that the thickness does not recover sufficiently to fill the space between the cassette and the casing in the final assembled position. It is consequently difficult to achieve the required support over the desired extent of the liner panel because gaps are present between the compressible material and the casing. The gaps may be filled with a filler adhesive but the quantity used can vary between engine installations and between operatives, giving the final product weight variation.

According to the present invention there is provided a method of securing a liner panel to a casing of a turbomachine with a foam material disposed between the liner panel and the casing, in which method the foam material is impregnated with a curable hardener composition, and the liner panel is secured to the casing to compress the foam material between the liner panel and the casing while the hardener composition is in an uncured condition, the hardener composition subsequently being cured to increase the rigidity of the foam material.

A method in accordance with the present invention thus enables the use of a foam material which is sufficiently resilient to recover after over-compression during installation of the liner panel, but is sufficiently rigid, after curing of the hardener composition, to provide support for the liner panel from the casing. The relatively high resilience can provide additional manufacturing tolerance which assists the locating of the panel before it is hardened and secured for normal use.

The foam material may be an open cell foam material, such as a reticulated foam. In the absence of the hardener composition, the foam may be a relatively high flexibility, low density foam. For example, the foam material may have a density not greater than 100 kg/m$^3$, for example less than 10 kg/m$^3$. The flexibility of the foam, as indicated by its compression force deflection (CFD—the force per unit area required to compress a sample of the foam to 25% of its original thickness), which may be less than 30 kPa, for example less than 20 kPa, less than 10 kPa, or less than 5 kPa.

The foam material may be a polyurethane based foam material. The hardener may be an epoxy adhesive, for example a syntactic adhesive. The hardener composition may be in the form of a viscous liquid or paste when uncured. The hardener may be curable by heating, for example to a relatively low temperature such as a temperature below 100° C., such as 50° C. The hardener composition may include filler or spacer materials, such as small hollow glass beads in order to reduce the density of the hardener composition.

A release coating may be applied to the surface of the casing contacted by the foam material, so that, upon removal of the liner panel, the foam material releases easily from the casing and remains attached to the liner panel.

During the securing of the liner panel to the casing, the liner panel may be displaced successively towards and away from the casing, respectively to compress the foam material and subsequently to allow the foam material to expand while the hardener composition is uncured, curing of the hardener material occurring while the foam material is in the expanded condition, and the liner in its installed position. Since the foam material is resilient while the hardener material remains uncured, it can be compressed, and subsequently expanded, to maintain contact with both the liner panel and the casing so that, following curing of the hardener material, the foam material forms a relatively rigid "bridge" between the casing and the liner panel, so that the liner panel is adequately supported by the casing.

The foam material may be in the form of at least one pad to support the liner panel at one or more desired locations. There may be four or more pads. There may be a pad located at multiple corners of the liner panel with one or more centrally located pads. The or each pad may have a diameter, or equivalent maximum transverse dimension, which is not less than 1 cm and not more than 5 cm, for example not less than 2 cm and not more than 3 cm. More than one pad size or shape may be used. On completion of the method, when the liner panel is fully secured to the casing and the hardener composition has cured, the thickness of the or each pad may be not less than 0.2 cm and not more than 2 cm, for example not less than 0.3 cm and not more than 1 cm.

The liner or casing may be provided with markings or features to assist in the correct location, orientation and number of pads applied.

For a better understanding of the present invention, and to show more clearly how it may be carried into effect, reference will now be made, by way of example, to the accompanying drawings, in which:—

Figure 1:
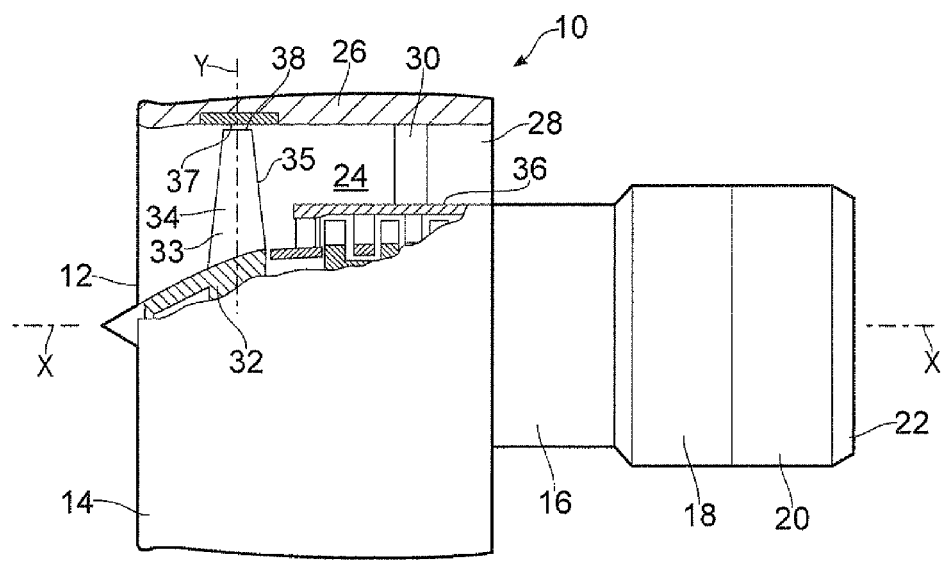
FIG. 1 is a schematic, partly sectioned, side view of a gas turbine engine.

A turbofan gas turbine engine 10, as shown in FIG. 1, comprises in flow series an intake 12, a fan section 14, a compressor section 16, a combustor section 18, a turbine section 20 and an exhaust 22. The turbine section 20 comprises one or more turbines arranged to drive one or more compressors in the compressor section 16 via shafts. The turbine section 20 also comprises a turbine to drive the fan blades 34 within the fan section 14 via a shaft. The fan section 14 comprises a fan duct 24 defined partially by a fan casing 26. The fan duct 24 has an outlet at its axially downstream end. The fan casing 26 is secured to the core engine casing 36 by a plurality of radially extending fan outlet guide vanes 30. The fan casing 26 surrounds a fan disc 32, which carries a plurality of circumferentially spaced radially extending fan blades 34. The fan disc 32 and fan blades 34 rotate about the axis X of the gas turbine engine 10, substantially in a plane Y perpendicular to the axis X. The fan casing 26 also comprises a fan blade containment assembly 37, which is arranged substantially in the plane Y of the fan blades 34. The fan blades 34 each have a leading edge 33, a trailing edge 35 and a tip 38. The fan casing 26 and fan blade containment assembly 37 is shown more clearly in FIG. 2. The fan blade containment assembly 37 comprises a metal cylindrical, or frustoconical, casing 40. The metal casing 40 is connected by means which are not shown in the Figures to the rest of the fan casing 26. The metal casing 40 comprises an annular hook 54 which is positioned axially upstream of the leading edge 33 of the tip 38 of the fan blade 34. The annular hook 54 extends in an axially downstream direction towards the fan blade 34.

A fan blade track panel 71 is installed in the metal casing 40. The panel 71 is one of a plurality of fan blade track panels 71 which are arranged circumferentially and axially along the inner surface of the metal casing 40 to form an annular fan blade track liner. Each fan blade track panel 71 comprises a skin 74 and a structure 76 to form an abradable structure. The skin 74 of the abradable lining defines the flow path through the fan duct 24. The skin 74 of each fan blade track panel 71 comprises a composite material, for example fibre reinforced plastic e.g. glass fibre reinforced epoxy resin, forming a layer between the honeycomb 76 and the abradable layer on the skin 74. The structure 76 comprises a honeycomb structure, for example an aluminium honeycomb, a titanium honeycomb, a composite material honeycomb, a resin impregnated paper honeycomb or other suitable honeycomb. The composite material honeycomb may comprise fibre reinforced plastic e.g. glass fibre reinforced epoxy resin. There may be an abradable material on the skin 74. The structure 76 of each fan blade track panel 71 is secured to a liner panel or cassette 120 by adhesive bonding.

The cassette 120 is secured to the casing 40 at a forward axially extending flange 124 on the axially upstream end of the cassette 120 and at an aft axially extending flange 126 on the axially downstream end of the cassette 120. The forward flange 124 engages the hook to secure the upstream end of the cassette 120 to the casing 40. An annular resilient sealing member 132 acts between the hook 54 and the flange 124 to bias the cassette 120 radially outwardly into contact with the inner surface of the casing 40.

The casing 40 has a plurality of circumferentially spaced inserts 136 extending radially inwardly from the inner surface of the casing 40. The inserts 136 have threaded apertures. The aft flange 126 is secured by one or more countersunk bolts or screws 140 to the inserts 136 to secure the downstream end of the cassette 120 to the casing 40.

The cassette 120 comprises a composite material, for example graphite reinforced plastics. Although not apparent in FIG. 2, the cassette 120 is not in direct contact with the inner surface of the casing 40. Instead, as shown in FIG. 3, pads 42 are disposed between the cassette 120 and the casing 40.

Each cassette 120 is installed by moving it in an axially upstream direction so that the forward flange 124 locates on the hook 54. Then the aft flange 126 is located on the inserts 136 and secured by the bolts or screws.

Figure 2:
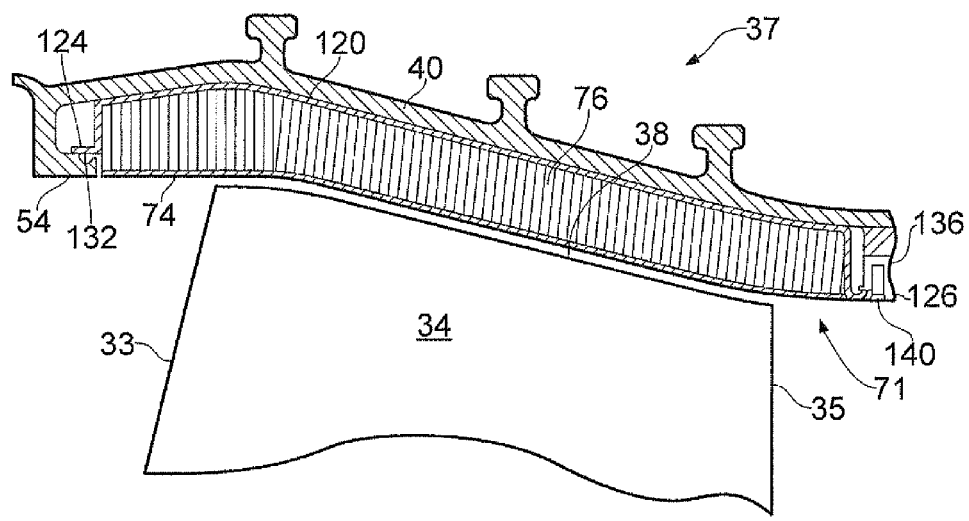
FIG. 2 is an enlarged sectional view of a containment assembly of the engine of FIG. 1.
Figure 3:
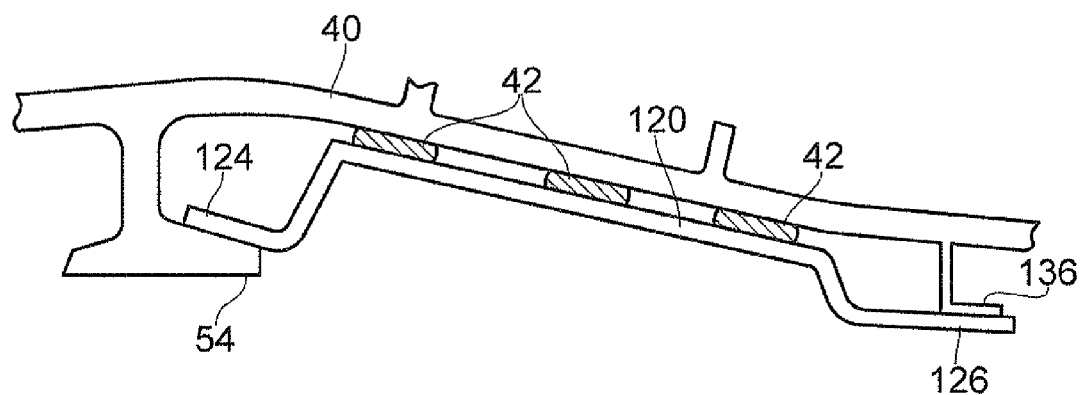
FIG. 3 is a schematic view of the containment assembly of FIG. 2.

Three pads 42 are shown in FIG. 3. The pads 42 may be arranged in any desired disposition that provides adequate support for the cassette 120 on the casing 40. For example, each cassette 120 (representing a segment of the fan blade track liner) may be provided with five of the pads 42, one disposed generally towards each corner of the portion of the cassette 120 which lies close to the casing 40, and one disposed generally centrally of that portion. The use of individual pads 42 of defined size and weight enables precise positioning of the pads 42, to achieve quality control and engine build uniformity. Locating features may be provided on the radially outer side of the cassette tray 120 to aid in the positioning of the pads 42. Each pad 42 comprises an open-cell, reticulated, polyurethane foam material having a relatively low density and relatively high flexibility. By way of example, the foam material may have a density less than 10 $kg/m^3$, and a CFD which is less than 10 kPa and possibly less than 5 kPa. In the completed structure as shown in FIGS. 2 and 3, the foam material is impregnated with a cured hardener composition which may, for example, be a viscous hard setting adhesive such as a two-part epoxy syntactic adhesive which is in the form of a paste when uncured. A suitable adhesive is available from Hexcel Corporation under the name Hexcel Redux 830. When cured, the adhesive becomes rigid, having a modulus in excess of 1000 MPa, for example 1500 MPa and a Shore D hardness in excess of 70. The cured adhesive thus serves to reduce or eliminate the resilience of the foam material so that it provides substantially rigid support for the cassette 120.

Figures 4A, 4B, 4C:
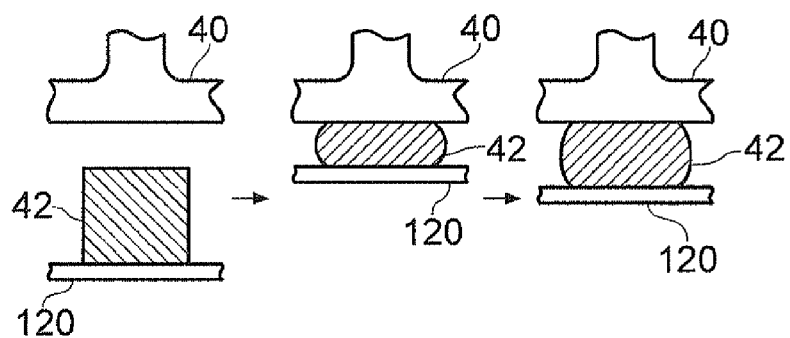
FIGS. 4A, 4B and 4C represent, in schematic form, different stages during the assembly of the containment section shown in FIG. 3.

During the assembly process as described above, the pads 42, with the hardener composition in an uncured condition, are applied to the back (ie radially outer) surface of the cassette 120 before the cassette 120 is offered to the casing 40. A release coating, for example a mould release agent such as Chemlease 41 available from Chem-Trend LP is applied to the inner surface of the casing 40 at least at the locations which will be engaged by the pads 42. As an alternative, the release film or coating may be applied to the pads 42, with or without an additional adhesive. The forward flange 124 is then engaged with the hook 54 and the cassette 120 is manipulated to engage the aft flange 126 with the insert 136 so that the bolts or screws 140 can be inserted. During this manipulation, the cassette 120 may be moved towards and away from the casing 40 by a small distance one or more times before it reaches its final position. During this process the pads 42 may be compressed between the cassette 120 and the casing 40 to different extents, as shown in FIGS. 4A, 4B and 4C. FIG. 4A represents the condition before the pad 40 first contacts the casing 42. The pad 42 is thus in its initial, uncompressed state. As shown in FIG. 4B, manipulation of the cassette 20 with respect to the casing 40 during the installation procedure may cause the pad 42 to be substantially compressed before it is allowed to expand again as the cassette 120 moves away from the casing 40 to its final position as shown in FIG. 4C.

Because the syntactic adhesive with which the foam material of the pad 42 is impregnated is uncured during the installation of the cassette 120, it retains the resilience of the basic polyurethane foam material. Consequently, as the cassette 120 moves away from the casing 40 (ie from the position shown in FIG. 4B to the position shown in FIG. 4C) it can expand again so as to remain in contact with both the cassette 120 and the casing 40.

When the cassette 120 is fully secured to the casing 40 at the flanges 124 and 126, the adhesive within the foam material of the pads 42 is caused or allowed to cure. For example, this can be achieved by heating the assembly to a temperature of 50° C., and maintaining that temperature for a period of 5 hours. Because the curing temperature is relatively low, the heating of the assembly can be performed by heater mats applied to the casing 40. Once the adhesive has cured, the pads 42 provide a rigid interface between the cassette 120 and the casing 40.

The pads 42 may be supplied pre-impregnated with the hardener composition (ie the adhesive) under conditions in which curing is prevented, for example at low temperature or hermetically sealed. The pads 42 may, for example, be pre-prepared on a backing sheet and stored in a freezer until required. When required, they may be removed from the backing sheet by an operator and applied to the cassette 120.

Although measures may need to be taken, such as increasing the temperature, in order to achieve rapid cure of the adhesive, curing may begin as soon as the pads are at room temperature, or exposed to the atmosphere. Consequently, it is desirable to use an adhesive, or other hardener composition, which cures only slowly under atmospheric conditions. For example, Hexcel Redux 830 allows approximately 70 minutes, while the adhesive remains sufficiently fluid to undergo compression and recovery as described above with reference to FIGS. 4A, 4B and 4C. In the context of the present specification, the hardener composition is considered to be uncured, even if the curing process has begun, while the hardener composition remains resiliently compressible to the extent required for the assembly process.

If a cassette 120 needs to be replaced, it can simply be detached from the insert 136 by releasing the bolt or screw 140, and pivoted away from the casing 40 until the forward flange 124 can be disengaged from the hook 54. The release agent applied to the casing 40 prevents bonding of the pads 42 to the casing 40, so that little and preferably no trace of the pad 42 is left on the casing 40. Instead, the pads 42 are removed with the cassette 120.

Although the present invention has been described with reference to the attachment of a fan track liner panel 71 to a fan casing 40, it is equally applicable to the attachment of panels to other casings of the engine, for example a compressor casing or a turbine casing. The present invention may be employed in the assembly of front acoustic panels, thrust reversers and outlet guide vane (OGV) infill panels. More generally, the present invention is also applicable to the attachment of panels in machinery other than a gas turbine engine. It will be appreciated that the size and location of the adhesive pads described in the above description are exemplary and may vary depending on the size and application of each part being secured.

The invention claimed is:

1. A method of securing a liner panel to a casing of a turbomachine with a foam material disposed between the liner panel and the casing, the method comprising:
impregnating the foam material with a curable hardener composition;
applying a release coating or film to a surface of the foam material adapted to contact the casing;
securing the liner panel to the casing to compress the foam material between the liner panel and the casing while the hardener composition is in an uncured condition; and
curing, subsequently, the hardener composition to increase the rigidity of the foam material.

2. The method of claim 1, wherein the foam material is an open cell or reticulated material.

3. The method of claim 1, wherein the foam material is flexible while the hardener composition is uncured.

4. The method of claim 1, wherein the foam material, in the absence of the hardener composition, has a density not greater than 100 kg/m$^3$.

5. The method of claim 1, wherein the hardener composition comprises an epoxy adhesive.

6. The method of claim 1, wherein the hardener composition is a syntactic composition.

7. The method of claim 1, further comprising at least one of the following steps:
heating the hardener composition;
curing the hardener composition by catalytic action; or
curing the hardener composition by exposure to air, water or other liquids to transform the hardener from an uncured state to a cured state.

8. The method of claim 1, wherein the hardener composition contains a filler of lower density than the uncured foam.

9. The method of claim 8, wherein the filler of lower density comprises hollow beads.

10. The method of claim 1, wherein a release coating is applied to the surface of the casing which is contacted by the foam material.

11. The method of claim 1, further comprising:
applying an adhesive to a surface of the release coating or film opposite to the foam material.

12. The method of claim 1, wherein:
during the securing of the liner panel to the casing, the liner panel is displaced successively towards and away from the casing, respectively to compress the foam material and subsequently to allow the foam material to expand while the hardener composition is uncured, and
the curing of the hardener composition occurs while the foam material is in the expanded condition.

13. The method of claim 12, wherein following curing of the hardener composition, the foam material is in the form of at least one pad having a thickness not less than 0.2 cm and not more than 2 cm.

14. The method of claim 1, wherein the foam material is in the form of at least one pad having a maximum transverse dimension which is not less than 1 cm and not more than 5 cm.

15. A method of securing a liner panel supporting an abradable liner to a gas turbine fan casing of a turbomachine with a foam material disposed between the liner panel and the gas turbine fan casing, the method comprising:
impregnating the foam material with a curable hardener composition, the foam material being fully impregnated with the curable hardener composition;
securing the liner panel to the gas turbine fan casing to compress the foam material between the liner panel and the gas turbine fan casing while the hardener composition is in an uncured condition; and
curing, subsequently, the hardener composition to increase the rigidity of the foam material.

16. The method of claim 15, wherein the foam material is in the form of a plurality of pads.

17. The method of claim 15, wherein the abradable liner defines a flow path through a fan duct.

18. The method of claim 15, wherein the liner panel further comprises a honeycomb structure and a skin, the skin defining a flow path through a fan duct.

19. The method of claim 15, wherein the gas turbine fan casing contains and encloses at least one fan blade.

20. A method of securing a liner panel to a casing of a turbomachine with a foam material disposed between the liner panel and the casing, wherein the casing contains and encloses at least one fan blade, the method comprising:
impregnating the foam material with a curable hardener composition, the foam material being fully impregnated with the curable hardener composition;
securing the liner panel to the casing to compress the foam material between the liner panel and the casing while the hardener composition is in an uncured condition; and curing, subsequently, the hardener composition to increase the rigidity of the foam material.

* * * * *

UNITED STATES PATENT AND TRADEMARK OFFICE
CERTIFICATE OF CORRECTION

PATENT NO.         : 8,747,586 B2  
APPLICATION NO.    : 12/883367  
DATED              : June 10, 2014  
INVENTOR(S)        : Ross Collins Page 1 of 1

It is certified that error appears in the above-identified patent and that said Letters Patent is hereby corrected as shown below:

On The Title Page, Item (76) Inventors should read
--(76) Ross Collins, Rowville (AU)--.

Signed and Sealed this
Seventh Day of June, 2016

Michelle K. Lee
*Director of the United States Patent and Trademark Office*